United States Patent [19]

Wollermann-Windgasse et al.

[11] Patent Number: 4,815,093
[45] Date of Patent: Mar. 21, 1989

[54] DEVICE FOR A MODULAR POWER LASER

[76] Inventors: Reinhard Wollermann-Windgasse, Höhenstrasse 13, 7143 Vaihingen/Enz-Riet; Frank Ackermann, Hohenzollernstrasse 16, 7000 Stuttgart; Bernd Faller, Hirschlanderstrasse 2, 7257 Ditzingen, all of Fed. Rep. of Germany

[21] Appl. No.: 115,420
[22] Filed: Nov. 2, 1987
[51] Int. Cl.⁴ .................................................. H01S 3/03
[52] U.S. Cl. ........................................ 372/62; 372/61; 372/93; 372/55
[58] Field of Search ..................... 372/62, 61, 55, 93

[56] References Cited

U.S. PATENT DOCUMENTS

| | | | |
|---|---|---|---|
| 4,481,632 | 11/1984 | Herbrich et al. | 372/61 |
| 4,573,162 | 2/1986 | Bakowsky et al. | 372/61 |
| 4,602,372 | 7/1986 | Sasaki et al. | 372/61 |
| 4,622,675 | 11/1986 | Penn | 372/61 |
| 4,646,336 | 2/1987 | Koseki | 372/65 |
| 4,661,958 | 4/1987 | Bowes et al. | 372/61 |
| 4,679,201 | 7/1987 | Klingel | 372/61 |
| 4,703,487 | 10/1987 | Koseki | 372/97 |

Primary Examiner—Leon Scott, Jr.

[57] ABSTRACT

A longitudinal-flow modular $CO_2$ laser having at least one CW output power has metallic end-flange devices at the two ends of the laser and a metallic intermediate-flange device at the transition from one laser module to another laser module. The flange devices have flank-sides and end-faces with mounting bores. A plurality of dielectric individual tubes are provided between the flange devices. The dielectric individual tubes have end regions mounted in the end-face mounting bores of the metallic flange devices. Flank-side gas inlet and outlet connections are provided at the flange devices. A large volume chamber is provided permitting gas flow between the mounting bores and the gas connections. The chamber connects two of the mounting bores and is disposed within at least one of the end-flange and intermediate-flange devices.

7 Claims, 4 Drawing Sheets

DEVICE FOR A MODULAR POWER LASER

The invention relates to a device for a longitudinal-flow modular CO2 laser having at least one CW output power.

BACKGROUND OF THE INVENTION

Such a laser is previously known as a result of distribution in the Federal Republic of Germany. In many respects, it corresponds to the disclosure from German Laid Open Specification No. 34 22 525.0-33. The energy at the output of such a laser depends upon how much HG energy is supplied to the gas and depends upon the quantity of the gas supplied. As is known, the gas is consumed. An attempt was made to raise the power from 1.5 kW to 3 kW, in that twice as much HF energy was supplied and the gas throughput was doubled. However, what was achieved was by no means twice as much, but substantially less. It would now be possible to increase the helium proportion of the gas mixture. As is known, the gas mixture consists of approximately 10% CO2, 20% N2 and 70% He. This would have meant that it would have been necessary to increase the helium proportion, for example, to 90%. For specific reasons, this did not enter into consideration. Likewise, no consideration was given to the adoption of a different type of cooling, e.g. nitrogen cooling.

OBJECT AND STATEMENT OF THE INVENTION

The object of the invention is to provide a device for a longitudinal-flow modular CO2 laser, which permits the power of a laser to be increased, on the basis of simple measures, while maintaining substantially the same principles.

According to the invention, this object is achieved by the following features:

Metallic end-flange devices are provided at the two ends of the laser. At least one metallic intermediate-flange device is provided at the transition from one laser module to another laser module.

The metallic end-flange devices and the metallic intermediate-flange device have flank-sides and end-faces with mounting bores therein.

A plurality of dielectric individual tubes are provided between the metallic end-flange devices and the metallic intermediate-flange device.

The dielectric individual tubes have end regions mounted in the end-face mounting bores of the metallic flange devices.

Flank-side gas inlet connections are provided at some of the end-flange and intermediate-flange devices.

Flank-side gas outlet connections are provided at some of the end-flange and intermediate-flange devices.

And at least one communication device is provided permitting gas flow between the mounting bores and the gas connections. The communication device connects at least two of the mounting bores and is disposed within at least one of the end-flange and intermediate-flange devices. The communication device is a large-volume chamber into which the mounting bores open directly, the longitudinal extent of which is at least as great as the spacing of the two mounting bores.

On this basis, the obliquely extending gas supply lines in the flange devices, which gas supply lines are relatively difficult to fit, are also dispensed with. The flange devices also become considerably lighter. No change is made to the former symmetrical supply of the gas to the flange devices. It is now possible to leave the gas composition, and to use dielectric individual tubes having the former internal diameter; there is no need to lengthen these, no new type of cooling for the gas is required, and, if the HF energy is doubled and the gas throughput is doubled and the gas throughput is doubled, substantially twice as much laser power is also obtained. Production of the large-volume chamber costs almost nothing, in comparison with other changes. The large-volume chamber appears to act as a pressure compensation, so that the same pressure prevails everywhere in it. Moreover, the pressure prevailing in it is substantially the pressure which prevails at the ends of the gas inlet connections, and the pressure prevailing at the gas outlet connections is clearly, for practical purposes, the pressure which prevails at the outlet of the mounting bores which are set downstream. The gas can become well stabilized in the large-volume chamber and can flow out from it into the dielectric individual tubes in a favorable manner, and also the gas can easily empty out from the dielectric individual tubes into the large-volume chambers.

The gas supply is, in fact, invariably such that the gas is supplied to some flange devices. In those flange devices in which the gas is drawn off, there is then twice as great a quantity of gas, and in this case it is particularly necessary to provide the large-volume chamber.

Additionally, the preferred embodiment described includes the following advantageous features:

The mounting bores open obtusely into the chamber. By this feature it is achieved that the gas can flow from the chamber into the individual tubes without additional bends.

A lateral cover closes the chamber and carries the gas connections, and the chamber has corner regions with quarter-radii. The chambers can on the one hand be produced easily, but on the other hand can also easily be made gas-tight towards the outside. In particular, it is then possible to produce the chamber by means of shank cutters, which have a relatively large radius; in this case, the quarter radii, which remain standing on account of the contour of the shank cutter, and avoid the dead corners which would otherwise be present. The quarter radii are also more favorable in relation to mechanical stresses, since with rectangular corners the stresses are concentrated in the corner.

The communications device is located in an intermediate-flange device. The invention is important especially in the case of the devices according to this feature. On account of the cooling of the mirrors, the end-flange devices do, in fact, constantly receive a supply of gas, i.e. the simple quantity of gas. However, as a result of the exhaust flow, twice the quantity of gas is present at some of the intermediate-flange devices, and the chambers are necessary particularly there.

All of the end-flange and the intermediate-flange devices are equally large and have a plurality of the chambers, all of which are equally large. Both a rationalization effect and also an improved temperature progression of the gas are achieved. If the gas-supplying chambers are of the same size as the gasexhaust chambers, then the gas-supplying chambers are, of course, apparently overdimensioned. However, this leads to a situation in which the gas on the inlet side does not heat up to such an extent as is invariably the case if gas is compressed against a resistance. For example, the mirrors or the like then also remain cooler.

The chamber has a planar floor. By this feature, a simplification in the chamber production is achieved. It has become evident that it is not necessary to utilize the floor as a conducting surface for the gas passage, i.e. to allow it to rise in a wedge-shaped configuration towards the gas connections. Rather, in spite of the planar floor, the chambers bring the desired effect, and moreover weight is also saved by this means.

At least four mounting bores are arranged in pairs disposed one above the other, and a pair of chambers are on a flank side, each of which connects two of the mounting bores disposed one above the other.

The laser has a geometric longitudinal central axis and comprises a pair of chambers, which are symmetrical, seen in relation to the geometric longitudinal central axis. By the features, a symmetrical heat distribution is also achieved; this is good from the point of view of the mechanically uniform stressing of the laser structure.

DESCRIPTION OF THE DRAWINGS

The invention is now described with reference to a preferred illustrative embodiment. In the drawing.

DESCRIPTION OF A PREFERRED EMBODIMENT

Figure 1:
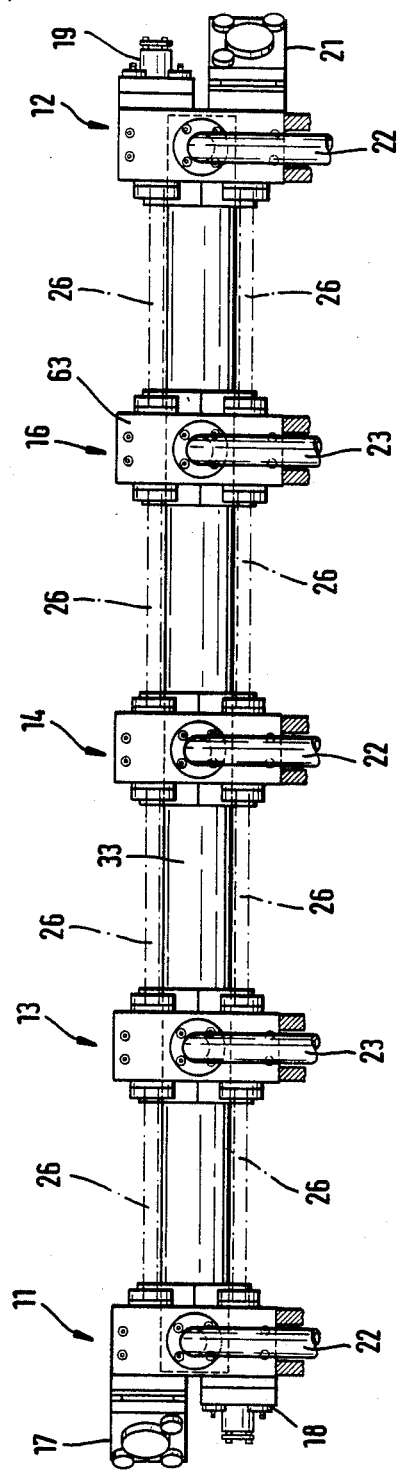
FIG. 1 shows the side elevation of a laser, consisting of four segments, but without cooling device and HF supply device.
Figure 2:
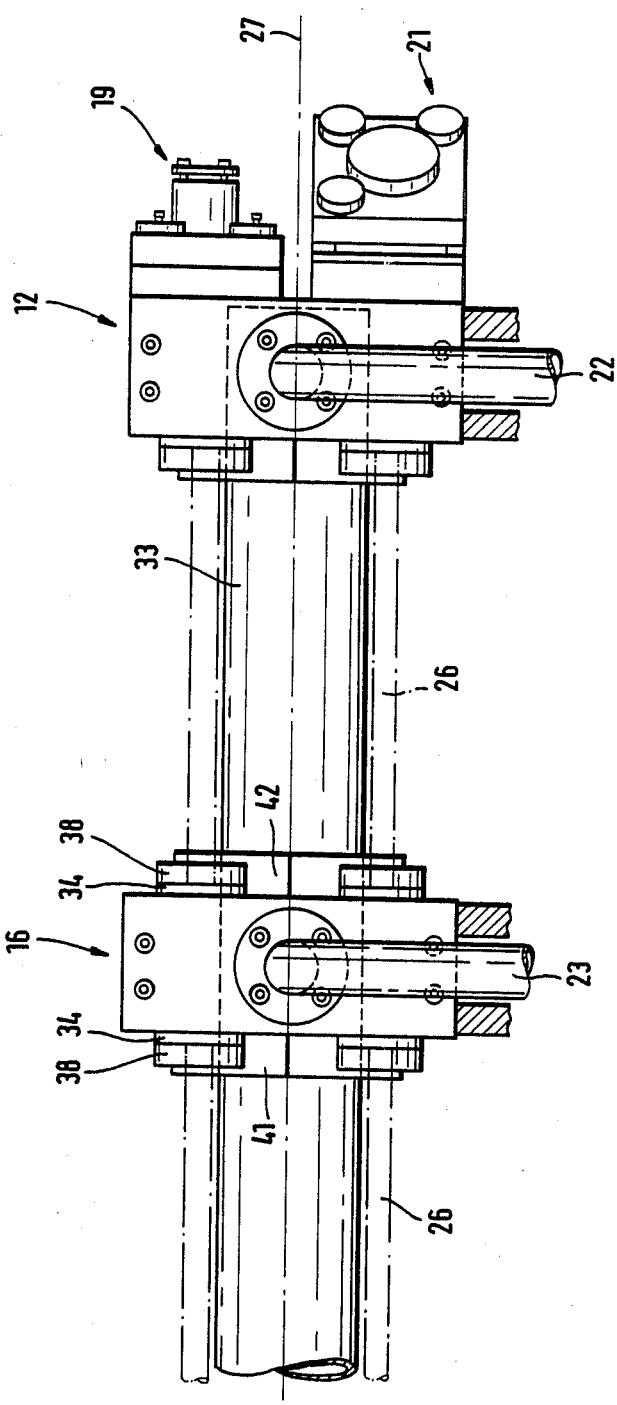
FIG. 2 shows an enlarged elevation of the right-hand region from FIG. 1.

A laser according to FIG. 1 has a left-hand end-flange device 11, a right-hand end-flange device 12 and three intermediate-flange devices 13, 14 and 16. A housing 17 for a 45° mirror and a housing 18 for a 180° mirror are provided on the left at the end-flange device 11. A housing 19 for a 180° mirror and a housing 21 for a 45° mirror are provided on the right at the end-flange device 12. The laser rests on a frame (not shown), which comprises a heat exchanger and a gas pump. Cooled, unconsumed gas is supplied via inlet lines 22 to the end-flange devices 11, 12 and to the intermediate-flange device 14. Gas is supplied symmetrically from rearwards to these flange devices 11, 14, 12 through inlet lines which are not visible in this elevation. Consumed gas is drawn off from the intermediate-flange devices 13, 16 via outlet lines 23. The outlet line 23 is shown only in broken lines in FIG. 4. The symmetrical outlet line 24 is shown broken away. Dielectric individual tubes 26 extend between the flange devices, and specifically four in each instance along the geometric central axis 27 of the laser. The individual tubes 26 are disposed in each instance as a group of four. According to FIG. 4, left-hand mounting bores 29 and right-hand mounting bores 31 are provided on the right and on the left (as also in all other flange devices). The left-hand mounting bores are in alignment in the vertical direction, and likewise the right-hand mounting bores 31. Moreover, the upper left-hand and right-hand mounting bores 29, 31 and the lower right-hand and left-hand mounting bores 29, 31 are in alignment. Coaxially with the geometric central axis 27, there is provided in the intermediate-flange devices 13, 14, 16 a passage bore 32, through which a support tube 33 of large diameter passes. The end-flange device 11 has only on its right-hand side, and the end-flange device 12 has only on its (left-hand side, such a coaxial bore, which is, however, not a passage bore, and there receives the end regions of the support tube 33. In front of each mounting bore 29, 31 and coaxially in alignment with this, a flange disc 34 is screwed on, which has embedded, coaxially about its central opening 36, a sealing ring 37 in a receiving groove. The flange disc 34 has an identical sealing ring on the back, so that the flange disc 34 is sealed towards the front and back.

Figure 4:
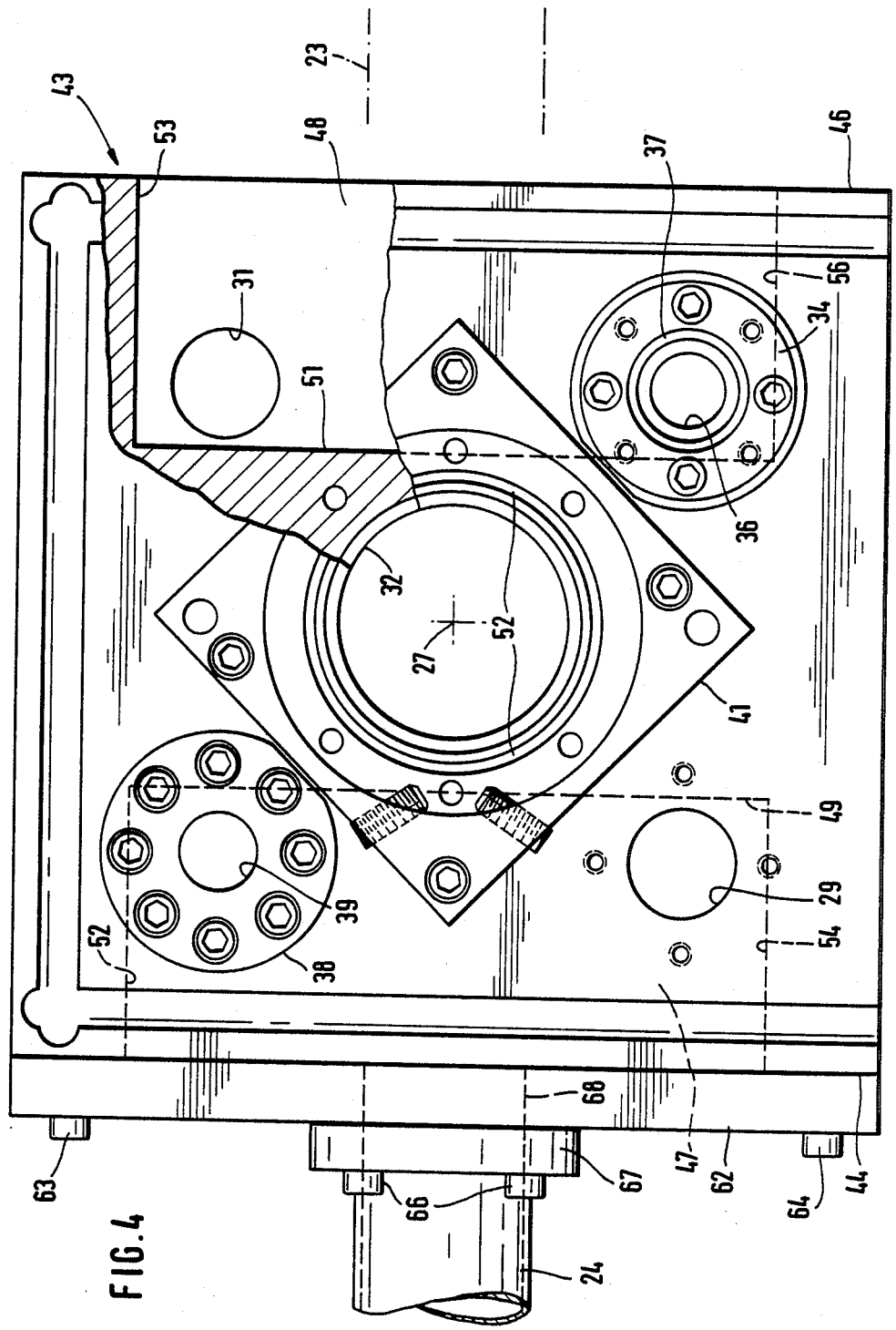
FIG. 4 shows an elevation onto FIG. 3 from the left.

The flange disc 34 alone can be seen on the right, at the bottom, in FIG. 4. At the top on the left, in FIG. 4, it is covered by a screwed-on corner disc 38, the central opening 39 of which is slightly larger than the central opening 36. Coaxially with the geometric central axis 27 and thus also with the passage bore 32, there is situated on both sides of the intermediate-flange device 16 a support tube flange 41, 42, which has, according to FIG. 4, a square contour and stands upright. The flange devices are secured to the continuous support tube 33 by means of the support-tube flanges 41, 42. Of course, the end-flange devices 11 and 12 have such flange discs 34, cover discs 38 and support-tube flanges only on the mutually facing surfaces.

Figure 3:
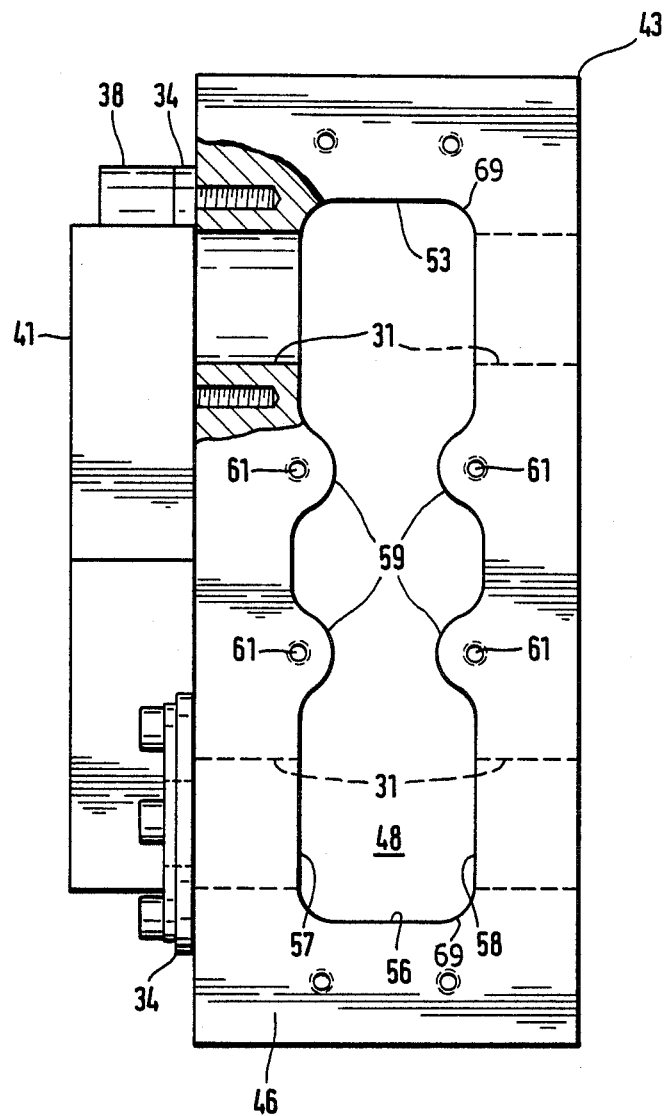
FIG. 3 shows an elevation of the left-hand intermediate-flange device of FIG. 2 with the cover removed, partially cut away, and mounting flanges disassembled on the right.

The intermediate-flange device 16, which is described in greater detail as representative of the other flange devices, comprises a square-cube-shaped aluminum block 43. It has an edge length of 23 cm and is 9 cm thick. On the basis of these measurements, FIGS. 3 and 4 are to scale. The aluminum block 43 has a left-hand, planar, vertical, smooth surface 44 and a similar right-hand surface 46, the surfaces 44, 46 being parallel to one another in the vertical direction. A left-hand chamber 47 and a right-hand chamber 48 are worked in each instance into these surfaces 44, 46. The floors 49, 51 extend so as to be planar and vertical. The floors 49, 51 are situated, on the one hand, so as to be so deep that they extend inwards to beyond the mounting bores 29, 31, as FIG. 4 shows particularly clearly at the top on the right. On the other hand, however, they do not extend so deep as to intercept the passage bore 32. A considerable material bridge 52, continues to remain standing between the floors 49, 51 and the passage bore 32. Accordingly, the left-hand mounting bores 29 open into the left-hand chamber 47 and the right-hand mounting bores 31 into the right-hand chamber 48 at right angles and with maximum diameter. The upper side wall 52, 53 of each chamber 47, 48 is in alignment in terms of height and extends horizontally and in a plane. The same applies, mutatis mutandis, for the lower side walls 54, 56. They extend below the mounting bores 29, 31, so that these are unobstructedly connected to the chamber volumes. In each chamber, the side walls 57, 58 extend from quarterradii 69 that create a transition from the upper side walls 52, 53 and the bottom side walls 54, 56. The side walls 57, 58 extend substantially vertically, with the exception of arcuate bypasses 59 of threaded bores 61. Accordingly, the threaded bores 61 can be led up relatively close to the volume of the chambers; this gives an improved secured facility for cover 62. According to FIG. 3, the total width of the chamber 48 is in the region of half the thickness of the aluminum block 43, so that, in an outward direction, sufficient material still remains over for stiffness purposes.

The covers 62 provided on both sides of the aluminum block 63 have an outline according to the rectangular surface 46 and are there secured, over a large surface area and in a gas-tight manner, by means of upper screws 63, lower screws 64 and a seal (not shown) in the cover 62. Four central screws 66 are screwed into the threaded bore 61, which central screws not only press the cover 62 against the surface 46, but also hold a further flange 67, which mounts the outlet line 24 in its end region. The cover 62 has, in continuation of the outlet line 24, a central middle bore 68. Accordingly, in the favorable manner explained initially, the gas can flow in out of the individual tubes 26 into the mounting bores 29, 31, become stabilized in the chambers 47, 48 under equal pressure and flow away out of the central bore 68 into the outlet line 24, whereafter it passes to the heat exchanger and to the gas pump.

In the illustrative embodiment according to FIG. 1, outlet conditions prevail in the intermediate-flange devices 13, 16 for the gas, and inlet conditions prevail in the flange devices 11, 14 and 12.

In reality, the outlet lines 23, 24 are, in cross-section, twice as large as the inlet lines 22.

What is claimed is:

1. A device for a longitudinal-flow modular folded $CO_2$ laser having a geometrical longitudinal central axis and two ends, said laser having at least one KW output power, comprising
    metallic end-flange devices at said two ends of the said laser,
    at least one metallic intermediate-flange device,
    said metallic end-flange devices and said at least one metallic intermediate-flange device having two flank-sides and end-faces each with four mounting bores spaced-apart therein,
    at least four dielectric individual tubes between said metallic end-flange devices and said at least one metallic intermediate-flange device,
    said dielectric individual tubes having end regions mounted in said end-face mounting bores of said metallic flange devices,
    flank-side gas inlet connections at at least certain of said end-flange and intermediate-flange devices,
    flank-side gas outlet connections at at least certain of said end-flange and intermediate-flange devices,
    a pair of communication devices permitting gas flow between said mounting bores and said gas connections, each of said communication devices connecting at least two of said mounting bores and being disposed within at least one of said end-flange and intermediate-flange devices,
    said pair of communication devices comprising large-volume chambers that are symmetrical, seen in relation to said geometric longitudinal central axis of the laser, into which said mounting bores open directly, and the longitudinal extent of which are at least as great as the spacing between two of said mounting bores and
    lateral covers closing said chambers and carrying said gas connections.

2. The device as claimed in claim 1, wherein said mounting bores open obtusely into said chamber.

3. The device as claimed in claim 2, wherein all of said end-flange and said intermediate-flange devices are equally large and have a plurality of said chambers all of which are equally large.

4. The device as claimed in claim 1, wherein said chamber has corner regions with quarter-radii.

5. The device as claimed in claim 1, wherein said communications device is located in an intermediate-flange device.

6. The device as claimed in claim 1, wherein said chamber has a planar floor.

7. The device as claimed in claim 1, comprising at least four mounting bores arranged in pairs disposed one above the other, and a pair of said chambers on a flank side, each of which connects two of said mounting bores disposed one above the other.

* * * * *